US012590821B2

(12) United States Patent
Klotz

(10) Patent No.: US 12,590,821 B2
(45) Date of Patent: Mar. 31, 2026

(54) SIGNAL PROCESSING DEVICE, ROTARY MEASURING DEVICE, ROTARY MEASURING SYSTEM, AND VEHICLE

(71) Applicant: ZF CV Systems Global GmbH, Bern (CH)

(72) Inventor: Eckard Klotz, Bad Pyrmont (DE)

(73) Assignee: ZF CV Systems Global GmbH, Bern (CH)

( * ) Notice: Subject to any disclaimer, the term of this patent is extended or adjusted under 35 U.S.C. 154(b) by 145 days.

(21) Appl. No.: 18/600,293

(22) Filed: Mar. 8, 2024

(65) Prior Publication Data

US 2024/0210215 A1 Jun. 27, 2024

Related U.S. Application Data

(63) Continuation of application No. PCT/EP2022/073025, filed on Aug. 18, 2022.

(30) Foreign Application Priority Data

Sep. 8, 2021 (DE) ..................... 10 2021 123 244.9

(51) Int. Cl.
*G01D 5/244* (2006.01)
*G01D 5/245* (2006.01)
(52) U.S. Cl.
CPC ......... *G01D 5/24428* (2013.01); *G01D 5/245* (2013.01)
(58) Field of Classification Search
CPC .. G01D 5/12; G01D 5/14; G01D 5/16; G01D 5/244; G01D 5/24428; G01D 5/24457; G01D 5/24471; G01D 5/24485; G01D 5/245
See application file for complete search history.

(56) References Cited

U.S. PATENT DOCUMENTS

2003/0141862 A1 7/2003 Vig et al.
2015/0149112 A1 5/2015 Von Berg
(Continued)

FOREIGN PATENT DOCUMENTS

DE 37 34 938 A1 5/1989
DE 102 44 923 A1 4/2004
(Continued)

OTHER PUBLICATIONS

English translation and Written Opinion of the International Searching Authority dated Dec. 9, 2022 for international application PCT/EP2022/073025 on which this application is based.
(Continued)

*Primary Examiner* — Huy Q Phan
*Assistant Examiner* — David B Frederiksen
(74) *Attorney, Agent, or Firm* — Walter Ottesen, P.A.

(57) ABSTRACT

A signal processing device, preferably for a vehicle, for a rotary measuring device having a rotary measuring sensor and a rotary scale body. The rotary scale body has a feature count of measurement features. The signal processing device is configured to provide successive message sequences for signal processing. A message sequence has a message count of successive messages such that chronologically successive messages are associated with measurement features—which are locally adjacent and chronologically successively interact with the rotary measuring sensor—and each message is provided in a message type selected from a predetermined number of message types. A message arranged at a fixed sequence position is a message of a predetermined type which describes a feature property of the associated measurement feature. The signal processing device can generate the message sequences such that the message count and the feature count are coprime with one another.

28 Claims, 4 Drawing Sheets

(56)                    References Cited

U.S. PATENT DOCUMENTS

| | | | |
|---|---|---|---|
| 2017/0074683 A1 | 3/2017 | Kwon et al. | |
| 2017/0167891 A1* | 6/2017 | Maeda | G01D 5/145 |
| 2017/0315146 A1* | 11/2017 | Koeck | G01L 3/101 |
| 2018/0087930 A1 | 3/2018 | Motz et al. | |
| 2018/0162183 A1* | 6/2018 | Park | B60C 23/0461 |
| 2019/0265069 A1* | 8/2019 | Roberts | G01D 5/145 |
| 2020/0081074 A1 | 3/2020 | Fontanesi et al. | |
| 2020/0256709 A1 | 8/2020 | Weber | |
| 2020/0285807 A1* | 9/2020 | Xu | G06N 3/09 |
| 2022/0018687 A1* | 1/2022 | Cosgrave | G01D 3/08 |

FOREIGN PATENT DOCUMENTS

| | | |
|---|---|---|
| DE | 10 2013 224 247 A1 | 5/2015 |
| DE | 10 2017 121 922 A1 | 3/2018 |
| DE | 10 2017 130 000 A1 | 6/2019 |
| DE | 10 2018 121 998 A1 | 3/2020 |
| DE | 10 2020 103 106 A1 | 8/2020 |
| DE | 11 2015 002 417 B4 | 2/2022 |

OTHER PUBLICATIONS

English translation and Written Opinion of the International Searching Authority dated Dec. 7, 2022 for co-pending international application PCT/EP2022/073012.
International Search Report of the European Patent Office dated Dec. 9, 2022 for international application PCT/EP2022/073025 on which this application is based.
International Search Report of the European Patent Office dated Dec. 7, 2022 for co-pending international application PCT/EP2022/073012.

* cited by examiner

SIGNAL PROCESSING DEVICE, ROTARY MEASURING DEVICE, ROTARY MEASURING SYSTEM, AND VEHICLE

CROSS-REFERENCE TO RELATED APPLICATIONS

This application is a continuation application of international patent application PCT/EP2022/073025, filed Aug. 18, 2022, designating the United States and claiming priority from German application 10 2021 123 244.9, filed Sep. 8, 2021, and the entire content of both applications is incorporated herein by reference.

TECHNICAL FIELD

The disclosure relates to a signal processing device. The disclosure furthermore relates to a rotary measuring device, a rotary measuring system and a vehicle.

BACKGROUND

Such a signal processing device is used for signal processing for a rotary measuring device. The rotary measuring device includes a rotary measuring sensor and a rotary scale body, the rotary scale body having a feature count of measurement features arranged along a circular path, which in particular are arranged equidistantly.

A measurement feature may be in various forms depending on the configuration of the rotary scale body. The rotary scale body can have for example a geometric, optical or magnetic material measure in the form of measurement features.

Such rotary measuring devices are generally known, in particular in the field of machines and vehicles. An instantaneous rotational position of a rotating part such as for example, a shaft or a wheel can be determined via a rotary measuring device. Furthermore, direction of rotation, rotational speed and further movement- and/or position-related parameters can be determined via a rotary measuring device. A wide variety of rotary measuring sensors, the sensor principle of which is based on a different measurement principle in each case, for example based on a magnetic, optical or inductive measurement principle, are known for a rotary measuring device. In the case of a magnetic measurement principle, in particular a Hall sensor can be used to output a voltage change that is characteristic of an instantaneous orientation of a scale body relative to the Hall sensor. A Hall sensor advantageously enables a reliable position determination independently of the rotational speed, in particular even if the rotating part is stationary or is rotating relatively slowly.

The signal processing device is configured to provide successive message sequences for signal processing purposes. The type of a message sequence can routinely be defined in an associated data protocol. Data protocols, in particular data sequences, for rotary measuring devices are likewise known. In this regard, a predefined specification which predefines a scheme of messages in a provided succession, that is, in a so-called message sequence, namely for providing and communicating measurement data of the rotary measuring device, may generally be provided in a data protocol or for a data sequence.

As such, a signal processing device mentioned in the introduction may be configured to output message sequences, a message sequence having a message count of successive messages, such that chronologically successive messages are chronologically successively associated with locally adjacent measurement features, wherein the measurement features interact with the rotary measuring sensor, and each message is provided in a message type selected from a predetermined number of message types.

The signal processing device mentioned in the introduction is configured to output message sequences such that a message arranged at a fixed sequence position in the message sequence is a message of a predetermined type which describes a feature property of the associated measurement feature.

Rotary measuring devices, rotary measuring systems and signal processing devices, in particular electronic signal processing devices, are furthermore worthy of improvement with regard to the signal processing. In particular, this concerns the lowest possible susceptibility to errors and an improved possibility for diagnostics during the signal processing.

It is therefore desirable to specify an improved signal processing device for a rotary measuring device, and also a rotary measuring device and a rotary measuring system.

SUMMARY

It is an object of the disclosure to specify, in an improved manner, an electronic signal processing device and a rotary measuring device in which the disadvantages of the prior art are overcome at least in part. In particular, the lowest possible susceptibility to errors and improved possibilities for diagnostics are intended to be made possible.

The object, concerning the signal processing device, in particular with a data protocol, is, for example achieved by a signal processing device for a rotary measuring device having a rotary measuring sensor and a rotary scale body having a feature count of measurement features, including: a non-transitory computer readable medium having program code stored thereon; the program code being configured, when executed by a processor, to cause the signal processing device to provide a plurality of chronologically successive message sequences; each of the message sequences having a message count of successive messages such that chronologically successive messages are chronologically successively assigned to locally adjacent measurement features, wherein the measurement features interact with the rotary measuring sensor, and each of the messages is provided in a message type selected from a predetermined number of message types; the message of the successive messages arranged at a fixed sequence position of the message sequences being a message of a predetermined type which describes a feature property of the assigned measurement features; and, the program code being configured to cause the signal processing device to generate the message sequences such that the message count and the feature count are coprime with one another.

The disclosure proceeds from a, in particular electronic, signal processing device mentioned in the introduction, preferably for a vehicle, for a rotary measuring device having a rotary measuring sensor and a rotary scale body, the rotary scale body having a feature count of measurement features.

The rotary measuring sensor is associated with the rotary scale body for the purpose of detecting measurement features, in particular for the purpose of detecting the measurement features in conjunction with a rotating movement of the rotary scale body.

The signal processing device is configured to provide successive message sequences for signal processing purposes.

A message sequence has a message count of messages such that one measurement feature in each case is associated with one message in each case, and another measurement feature in each case of the feature count is associated with each respective message of the message count.

A message arranged at a fixed sequence position in the message sequence is a message of a predetermined type which describes a feature property of the associated measurement feature. This applies to at least one message arranged at a fixed sequence position within the message sequence; there may also be provision for multiple messages of a predetermined type, each one of which describes in each case one feature property of the associated measurement feature.

According to the disclosure, there is provision for the signal processing device to be configured to generate the message sequences such that the message count and the feature count are coprime with one another.

Within the context of this application, "coprimeness" is intended to be understood to mean that there is no natural number other than "1" that divides both the message count and the feature count.

Generally, two natural numbers are called coprime if there is no natural number other than "1" that divides the two numbers. Relatively prime is also used as a synonym for coprime. That is, that if two natural numbers have no common prime factor, they are coprime. It follows from this definition that any natural number is coprime with "1", including the number "1" itself. To put it another way: a fraction including two coprime numbers cannot be canceled down, therefore. The highest common factor is usually used to demonstrate coprimeness. Two numbers are coprime if and only if "1" is their highest common factor. Within this context, the feature of coprimeness is intended to be understood to mean that there is no natural number other than "1" that divides both the message count and the feature count.

The feature according to the disclosure of "coprimeness" preferably applies to all message sequences equally.

As a result of the message sequence or the message sequences being generated such that the message count and the feature count are coprime with one another, a changing association between a message sequence and the measurement features covered by the message sequence is achieved, that is, an association that changes with each measurement cycle or with each rotation of the rotary scale body.

To put it another way: the concept of the disclosure achieves the effect that individual measurement features are not "skipped" in a constantly recurring manner with each rotation of the rotary scale body.

The "locally adjacent measurement feature" preferably means a "directly adjacent measurement feature", that is, it generally means the "next feature after a preceding feature in a defined succession of features". Correspondingly, "chronologically successive messages" preferably means "chronologically directly successive messages" and moreover means the temporal analog—that is, this concerns a message sequence and a measurement feature series in which an element (message/measurement feature) "n+1" follows after a preceding "n". The background is the tie to a fixed succession or a fixed relationship of an association.

Primarily, the association is preferably between directly adjacent measurement features and in each case the chronologically directly successive messages. Preferably, therefore, "directly" is primarily intended to mean that "the next measurement feature in the succession of measurement features follows without an intervening measurement feature" and "chronologically directly" is intended to mean the temporal analog in which a message follows the preceding message "without an intervening message". In a variation, there may possibly be another element (possibly unused) between two elements (message/measurement feature); however, the tie to a fixed succession or a fixed relationship of an association between adjacent measurement features and in each case the chronologically successive messages remains.

In short, this thus means that a message sequence has a message count of successive messages such that chronologically successive messages are associated with measurement features—which are locally adjacent and chronologically successively interact with the rotary measuring sensor.

In a second aspect, the disclosure presents a rotary measuring device for a rotating part, preferably for a vehicle, particularly preferably for a shaft or a wheel of a vehicle, including: a rotary measuring sensor having a pickup, a rotary scale body, and a signal processing device in accordance with a first aspect of the disclosure, which is connected to the pickup in a signal-carrying manner. Advantageously, the signal processing device is integrated in the rotary measuring sensor, particularly advantageously accommodated in a housing together with the pickup.

Preferably, the rotary scale body has a feature count of measurement features, in particular wherein the measurement features are arranged along a circular path and/or equidistantly. The rotary measuring sensor is associated with the rotary scale body for the purpose of detecting measurement features, in particular for the purpose of detecting the measurement features in conjunction with a rotating movement of the rotary scale body.

In a third aspect, the disclosure presents a rotary measuring system, preferably for a vehicle, including at least one rotary measuring device in accordance with the second aspect of the disclosure, and an association unit configured to associate the message of a predetermined type arranged at a selection position in the message sequence, in particular a status message of a message sequence, with a measurement feature.

In a fourth aspect, the disclosure presents a vehicle, including a rotary measuring device in accordance with the second aspect of the disclosure. The vehicle is preferably an automobile or a utility vehicle.

A rotary measuring device in accordance with the second aspect or a rotary measuring system in accordance with the third aspect of the disclosure can particularly advantageously be used in a vehicle since a lower susceptibility to errors and/or an improved possibility for diagnostics of the rotary measuring device are/is achieved in an improved manner by the signal processing device in accordance with the first aspect of the disclosure. In particular, the safety and reliability of the vehicle can advantageously be increased as a result.

In accordance with a fifth aspect of the disclosure, there is provision for a method for signal processing for a rotary measuring device having a rotary measuring sensor and a rotary scale body, the rotary scale body having a feature count of measurement features, wherein the method for signal processing includes the step of: providing successive message sequences, in particular by way of the signal processing device, wherein a message sequence has a message count of successive messages such that chronologically successive messages are associated with measurement features—which are locally adjacent and chronologically successively interact with the rotary measuring sensor—and each message is provided in a message type selected from a predetermined number of message types, and a message arranged at a fixed sequence position in the message sequence is a message of a predetermined type which describes a feature property of the associated measurement feature.

The method according to the fifth aspect has provision for the message sequences to be generated such that the message count and the feature count are coprime with one another.

In an embodiment, the rotary measuring system has an electronic control unit (ECU), which is implemented particularly advantageously within the scope of a computing and data processing device. The signal processing device and/or the electronic control unit (ECU) can advantageously be a microcontroller, for example an ASIC (Application-Specific Integrated Circuit, ASIC, also custom chip) chip. Advantageously, the signal processing device and/or the electronic control unit (ECU) have/has a communication interface, for example an antenna or suchlike wireless communication interface to the pickup. The pickup of the rotary measuring sensor is associated with the rotary scale body for the purpose of detecting measurement features, in particular for the purpose of detecting the measurement features in conjunction with a rotating movement of the rotary scale body. The electronic control unit can advantageously include an association unit and/or an association memory and/or a diagnostic unit.

The method is advantageously configured in the form of a computer-implemented method, including the steps of the method for signal processing.

In accordance with a sixth aspect of the disclosure, there is provision for a computer program product, wherein the computer program product includes instructions which, when the program is executed by a computer or suchlike electronic control unit (ECU), particularly advantageously within the scope of a computing and data processing device, cause the latter to carry out the steps of the method according to the fifth aspect.

Advantageous developments of the disclosure can be found in various embodiments and specify, in detail, advantageous possibilities for implementing the concept explained above within the scope of the stated problem and with regard to further advantages. It should also be understood that the signal processing device, preferably with an associated data protocol, in accordance with the first aspect of the disclosure, the rotary measuring device in accordance with the second aspect of the disclosure, the rotary measuring system in accordance with the third aspect of the disclosure, the vehicle in accordance with the fourth aspect of the disclosure, the method in accordance with the fifth aspect of the disclosure and the computer program product in accordance with the sixth aspect of the disclosure have identical and similar sub-aspects. In this respect, for the development of one aspect of the disclosure, reference is also made to the developments of the other aspects of the disclosure.

Advantageously, the measurement features are arranged on the rotary scale body along a circular path and/or equidistantly.

A measurement feature is advantageously formed by properties of the rotary scale body, in particular by the geometric, optical or magnetic properties of the rotary scale body. Besides the detection of a continuous measurement signal describing the instantaneous rotational position of the rotating part, it has proved to be advantageous to define measurement features by way of characteristic, in particular reliably detectable, locations on the rotary scale body. As such, a measurement feature can be arranged at a location of a local maximal or minimal manifestation of the rotary scale body, for example at a location of a locally maximally or minimally manifested magnetization or radial extent (for example, at the maximum of a tooth tip or at the minimum of a tooth trough) or the like. Moreover, a combination is possible, such that a measurement feature is formed by each local maximum and by each local minimum.

Alternatively or additionally, a measurement feature may be formed by other properties of the rotary scale body, advantageously by the location of a local change, in particular maximal change, generally of a property or a transition between properties of the rotary scale body.

Such a location may be formed for example by a tooth edge at a transition from a tooth tip to a tooth trough, or by a transition between two magnetic poles. It should therefore be understood that one or more measurement features can be associated with a material measure on the rotary scale body, for example a tooth or a tooth-trough pairing or a magnetic pole.

In an embodiment—which is also described in greater detail in regard to the embodiments as a pole wheel (target)—a rotary scale body can be implemented as a pole wheel (target). Nevertheless, a wide variety of implementation variants of these or other embodiments are possible, for example, as a toothed or perforated wheel or a magnetized wheel, for instance in the form of a drum, disk or the like. Reference made here in some instances to a pole wheel (target) as an embodiment should on no account be understood to be restrictive in this respect, but rather should be understood by way of example to explain a general principle.

A data protocol is understood to be a specification regarding the order of messages that are provided by the signal processing device or the rotary measuring device. The data protocol can thus serve merely for defining a data sequence. In developments, the data protocol can include further specifications, for example for defining the length and/or the encoding of individual messages.

Advantageously, the message of a predetermined type which is arranged at a fixed sequence position within the message sequence and describes a feature property of the associated measurement feature is a status message in accordance with a data protocol. The, in this advantageous development, at least one predetermined message of each message sequence, arranged at a fixed sequence position within the message sequence, is thus preferably a status message which describes a feature property of the associated measurement feature. The message sequence of the electronic signal processing device in accordance with the concept of the disclosure can advantageously be used to ensure that a status message is gradually—that is, with every measurement cycle or rotation of the rotary scale body—provided for a greater number of measurement features of the rotary scale body.

Better fault recognition is therefore advantageously achieved; this applies primarily to the status messages—which describe feature properties of an associated measurement feature.

In particular, it is ensured that in a measurement cycle a message sequence is associated with a number of measurement features that differ from measurement features detected in a previous measurement cycle, or previous rotation of the rotary scale body. Such changing association of the successive message sequences with the measurement features—and thus association of the messages—advantageously ensures that the message of a predetermined type, in particular a status message—which is always arranged at the same location in the order of the message sequence—is likewise provided with a changing association with a measurement feature. This advantageously ensures that a greater feature count of measurement features is acquired by a message of a predetermined type, in particular a status message.

Advantageously, the signal processing device is in the form of an electronic signal processing device, in particular with a protocol association in accordance with which the message of a predetermined type is in the form of a status message. For the sake of simplicity, this message of a predetermined type is referred to as a status message hereinbelow, it being fundamentally necessary to consider that in individual cases it should be regarded as a message of a predetermined type in accordance with the concept of the disclosure, even independently of a data protocol.

Owing to the evaluation, explained in more detail later on, of unforeseeable message times, each sensor is advantageously connected to the signal processing device as an evaluating device via a separate, "dedicated" electrical line. Preferably, the signal processing device is also in the form of an electronic signal processing device as a result of the interface of an electrical line to the sensor, in particular a separate electrical line configured specifically for evaluation.

Preferably, there is provision for a quotient of the feature count and the message count not to be an integer; this refers to a quotient of the feature count in the numerator and the message count in the denominator. The quotient of the feature count and the message count not being an integer thus means that integer division of the feature count by the message count always results in a remainder being left. The message count is therefore always made up of an integer-divisible portion and a remainder. In particular, this integer indivisibility also encompasses cases in which the feature count of measurement features is less than the message count of messages per message sequence. To put it another way, the development involves the feature count of measurement features not being an integer multiple of the message count of messages per message sequence.

This will be explained by way of example in comparison with a possible electronic signal processing device which, with a message count of 10 messages in a message sequence given a feature count of 60 measurement features, has a feature count 60 that is divisible by the message count of 10.

In this disadvantageous example of a possible electronic signal processing device, the consequence of this is that every revolution of the rotary scale body results in the same measurement features being associated with a message sequence, and therefore in the status messages also always being associated with a—in particular significantly smaller—subset of measurement features. Therefore, in particular faults, for example as a result of mechanical damage or another defect on the rotary scale body, at measurement features that are not part of this subset cannot be detected either.

In accordance with the concept of the disclosure, or in particular the aforementioned development, it is advantageously possible, however—even given limited measurement resolution or measurement data processing, for example simply with 3-bit representation of the measured values or messages—to detect faults, such as a wobble fault in the rotary scale body, early.

In one advantageous development, there is provision for an associated data protocol that provides for a message sequence with a message count of messages in an order and the successive message sequences are part of the data protocol. A data protocol should initially be understood generally as a predefined specification for a scheme of messages within a cyclically provided succession, that is, a so-called message sequence, namely for providing and communicating measurement data.

Preferably, the last message in the message sequence is the status message. This means that the fixed sequence position is at the last sequence position in the message sequence. Preferably, the other messages in the message sequence are channel messages. Preferably, precisely one message in the message sequence is a status message. A status message generally describes a feature property of a measurement feature in accordance with the concept of the disclosure and is able, in particular in contrast to messages of another kind, to describe state information providing an indication of the operating state, in particular of any fault states, of the measurement feature and in particular the rotary measuring device.

It should nevertheless be understood generally that "actual rotary measurement information" of the messages generally does not need to be included in the data content of the messages, but rather primarily lies simply in the initiation, in particular transmission, of the message per se; that is, preferably at the time at which transmission of the message is initiated by the rotary measuring sensor.

Whenever one of the measurement features of the rotary scale body, in particular a pole or tooth of a pole wheel, "passes", on its circular path, the rotary measuring sensor, the rotary measuring sensor sends a message; this is initially independent of the type of message, that is, relates to an aforementioned status message and equally a channel message, which will be explained subsequently. Depending on the rotational speed, messages of all types thus follow one another at different rates on a "line", for example, a transmission channel or connection or interface, between the rotary measuring sensor and the signal evaluation device. By way of example—if the geometry of the rotary scale body is known—a measure of its instantaneous rotational speed can be derived as rotary measurement information in particular from an interval of time between successive messages.

The period between two or more messages thus permits—independently of the type of message—conclusions to be drawn about the rotational speed. In one development, the rotary measurement information may additionally or alternatively lie in the number of messages provided by the rotary measuring sensor. This number permits conclusions to be drawn about the rotational movement completed by the rotary scale body, thereby allowing incremental rotational position determination to take place, for example.

This or another type of rotary measurement information may then preferably "also" be included in a channel message. A channel message denotes in particular a message, in particular a numerical value, which describes rotary measurement information. Rotary measurement information is preferably a value provided by the rotary measuring sensor, in particular together with a time stamp, and—depending on the chosen mode of operation of the rotary measuring device—may be orientation or speed information, for example. A channel message, in particular together with a time stamp, therefore describes rotary measurement information relating to the rotary measuring device. In one development, the rotary measurement information may lie merely in the time stamp for which a message is provided. In an embodiment, the signal processing device or the rotary measuring sensor may be configured to provide a time stamp for a message, in particular for each message.

Preferably, the message count of messages per message sequence is constant for each message sequence. Preferably, the data protocol includes successive message sequences. Preferably, the successive messages of a message sequence are associated with successive measurement features.

In an embodiment, there is provision for the data protocol for the signal processing device to be an AK protocol or a data protocol similar to the AK protocol. Preference is given to a protocol in the form of an AK protocol, in particular in version 4.0 according to "Requirement Specifications for Standardized Interface for Wheel Speed Sensors with Additional Information 'AK-Protocol'". This depicts a preferred scheme of messages within a cyclically provided succession, a so-called message sequence, for providing and communicating measurement data.

The AK protocol provides for a cyclic succession of in each case a constant, even message count of messages. In particular, such a protocol provides for a succession of nine so-called channel messages, which are used to determine the rotational position, rotational speed and/or further movement- or position-related parameters, and of a status message, which is used to determine state data, for example, the temperature or a so-called peak-to-peak value.

Status messages, in particular those in accordance with the AK protocol, include for example peak-to-peak messages, temperature messages or suchlike diagnosis-related status messages, which can be provided for each measurement feature. A status message is advantageously in the form of a peak-to-peak message or in the form of a temperature message according to the nature of an AK protocol, in particular one in version 4.0.

A message, in particular in accordance with the AK protocol, is referred to as a "word". A channel message, in particular in accordance with the AK protocol, is referred to as "channel selected" or as a "channel selected word". With general regard to the previously explained development of the concept of the disclosure in terms of a protocol, it should therefore be understood that, independently of their time of occurrence—independently of the type of message—all messages use their "words" to communicate further information, the meaning of which is dependent on the message type, however. The aforementioned channel messages are preferably "outwardly" in the same format (for example, 9 bits) as the status messages. Which message type is sent in each case is determined by the data protocol.

In accordance with the AK protocol, a status message can be referred to for example as a "peak-peak information word", a "temperature information word", an "overtemperature word", an "EEPROM-write required word" or an "EEPROM-write counter exceeded word". An AK protocol is used for example in the ATS sensors from the company Allegro MicroSystems, Manchester, NH, USA, for example in the ATS604 model.

In an embodiment, there is provision for the message count to be a prime number. Preferably, there is provision for the message count to be a prime number not occurring in the prime factor decomposition of the feature count. Particularly advantageously, there is provision for the message count to be the smallest of the prime numbers not occurring in the prime factor decomposition, or a prime number which is smaller than any of the prime numbers occurring in the prime factor decomposition. In one development, in which the message count is the smallest prime number not occurring in the prime factor decomposition of the feature count, it is advantageously ensured that all measurement features are detected relatively quickly.

The further advantage becomes clear when rotary scale bodies, for example pole wheels having for example, $5 \times 7 = 35$ or $7 \times 11 = 77$ teeth, are considered. In both cases, a message count of 13 or suchlike prime number certainly already achieves the fundamentally advantageous effect of the concept of the disclosure. However, a message count of 2 achieves even faster detection of the properties of all poles, in particular teeth of one of the aforementioned pole wheels, or generally of the measurement features of a rotary scale body—even a message count of 3 would be possible here with the aforementioned further advantage of even faster detection of the properties.

One development has provision for the message count to be the next highest prime number of the highest factor of the prime number product of the feature count. This means that the message count is a prime number which does not occur as a factor in the prime number product of the feature count.

Prime number product means the decomposition of the feature count into its prime factors, determined via prime factor decomposition. If, for example, as in the case of a feature count of 60, the prime factor decomposition yields a corresponding prime number product of $2 \times 2 \times 3 \times 5$, this results in the prime number 5 as the highest factor of the prime number product, and accordingly this development would involve the prime number 7, as the next highest prime number, being the message count of messages in the message sequence. A message count according to this development advantageously ensures that a status message is generated for actually every measurement feature of the rotary scale body, albeit only after a greater number of revolutions.

In the case of a prime number that—in contrast to the development described here—is part of the prime number product, for example in the case of a message count of two for an even feature count, a status message would always be generated for only half of the measurement features. As a result of the next highest prime number being chosen as the message count (and in particular not a random, even higher prime number), it is advantageously ensured that a status message has been generated for every measurement feature even after as small a number of revolutions as possible. Nevertheless, other numbers, in particular prime numbers, are possible as the message count in other developments, too.

In an embodiment, there is provision for a first message sequence type and a second message sequence type, which are alternately successive, the first message sequence type including a first status message, in particular a peak-to-peak message, and the second message sequence type including a second status message, in particular a temperature message. In such developments, various types of status messages can advantageously be detected and associated with a measurement feature, in particular in order to allow detection of a fault state and/or an operating state. Other developments of data protocols may advantageously include additional message sequence types, for example three or four, that alternate in succession in a similar manner, in particular in order to advantageously detect additional categories of status messages.

In an embodiment, there is provision for the message count of messages per message sequence to be seven. The message count seven has been found to be an advantageous message count, in particular for a series of feature counts, for example 60, 80, 100 or 120.

In an embodiment, there is provision for the message count of messages per message sequence to be seven and for the message sequence to include a first status message at the fourth location in the message sequence and a second status message at the seventh location in the message sequence, the first status message preferably being a peak-to-peak message and the second status message preferably being a temperature message.

In an embodiment, there is provision for the message sequence to include at least one status message, in particular two status messages.

In an embodiment, there is provision for the message sequence to include a sequence of six channel messages, a status message in the form of a peak-to-peak message, six channel messages, and a status message in the form of a temperature message.

In an embodiment of the rotary measuring device, there is provision for the rotary scale body to be in the form of a toothed wheel, in particular a measurement feature to be in the form of a tooth-trough pairing including a tooth tip and a tooth trough. Preferably, the rotary scale body has a feature count of 60 or 80 or 100 or 120 measurement features. The feature count can differ in other developments.

Preferably, the electronic signal processing device or the rotary measuring sensor includes an evaluation unit configured to provide the data protocol in accordance with the first aspect of the disclosure according to a measurement voltage of the rotary measuring sensor.

In an embodiment of the rotary measuring system, there is provision for an association unit configured to associate a message of a predetermined type in a message sequence with a measurement feature in the form of a value tuple, in particular on the basis of the message count. For the purpose of association with a measurement feature, each measurement feature may advantageously have an associated feature index, in particular in the form of an integral numbering. Advantageously, the value tuple can include further components, in particular an index for associating the value tuple in a table.

In an embodiment of the rotary measuring system, there is provision for an association memory, in particular association table, configured to store an associated message of a predetermined type, in particular the value tuple, for each of one or more measurement features. The association memory may be formed by a database, a flash memory or suchlike suitable storage means.

In an embodiment of the rotary measuring system, there is provision for an evaluation unit configured to recognize a fault state and/or an operating state according to the at least one measurement feature associated with the message of a predetermined type, in particular according to the at least one value tuple. The evaluation unit may be formed as a software module, in particular in the electronic control unit, or as a hardware module.

BRIEF DESCRIPTION OF DRAWINGS

The invention will now be described with reference to the drawings wherein.

DETAILED DESCRIPTION

Figure 1:
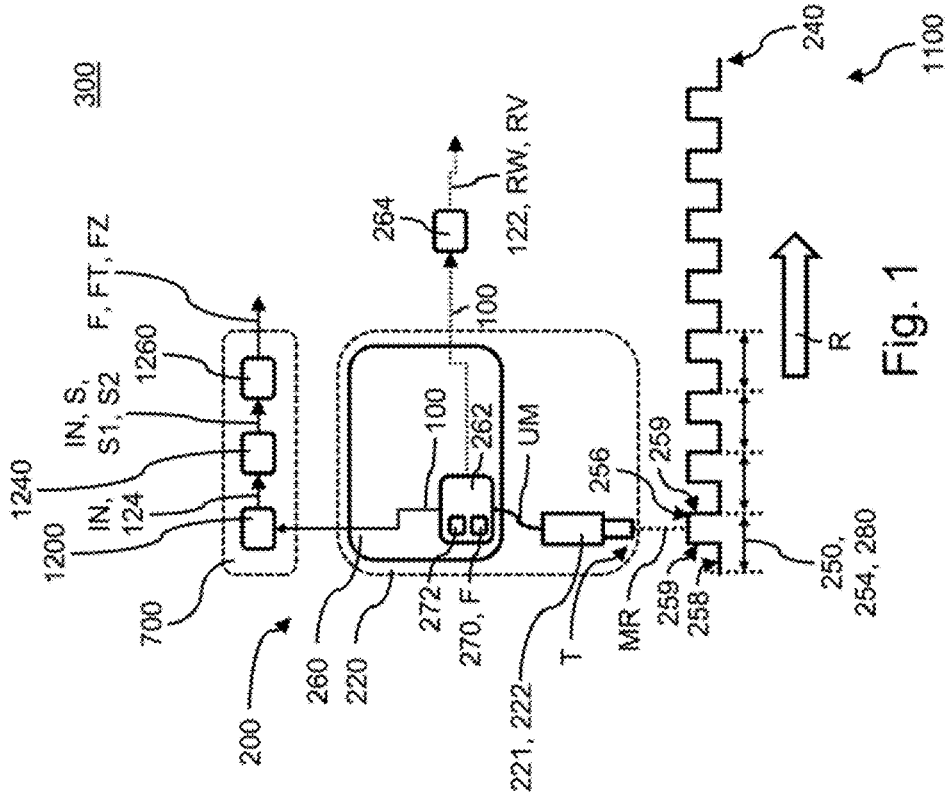
FIG. 1 shows a schematically depicted embodiment of a rotary measuring device in accordance with the second aspect of the disclosure, with a signal processing device in accordance with the first aspect of the disclosure, which is configured to provide successive message sequences in accordance with a data sequence.

FIG. 1 shows a schematically depicted embodiment of a rotary measuring system 300 having a rotary measuring device 200. The rotary measuring device 200 includes a rotary measuring sensor 220 and a rotary scale body 240. In the present case, the rotary measuring sensor 220 includes a pickup 221 in the form of a Hall sensor 222. The Hall sensor 222 is aligned with the rotary scale body 240, for example a pole wheel, in a measurement direction MR. The rotary scale body 240 is connected to a rotating part 1100, for example a wheel 540 of a vehicle 1000, for conjoint rotation therewith, in order to detect the rotational movement R thereof. The inherently known functioning of a Hall sensor 222 is described in a simplified way such that the presence of a measurement feature 250 in the measurement field— described here in a simplified way by the measurement direction MR—of the Hall sensor 222 is the basis for an induced measurement voltage UM being provided by the Hall sensor 222.

By way of example, the presence of a tooth tip 256 on a pole wheel, as an embodiment of the rotary scale body, results in a higher measurement voltage UM being provided compared with when a tooth trough 258 is present, although this association can also differ, for example depending on the alignment of the Hall sensor 222. Other properties, principally of the sensor, can also be taken into account, for example primarily a selection of the Hall elements of the Hall sensor 222.

A tooth tip 256 and a succeeding tooth trough 258 together form a tooth-trough pairing 254 in the present case. A tooth-trough pairing 254 forms a measurement feature 250 in the present case.

Nevertheless, as mentioned above for a different embodiment, a different association is possible, for example by virtue of each tooth edge 259 forming a measurement feature 250. In this case, two measurement features 250 would arise within a tooth-trough pairing 254; namely a first measurement feature for a rising tooth edge in the direction of rotation and a second measurement feature for a falling tooth edge in the direction of rotation.

In the present case, the rotary measuring device 200 furthermore has an electronic signal processing device 260 configured to provide a data protocol 100. In the present case, the signal processing device 260 is integrated in the rotary measuring sensor 220 and is connected to the pickup 221 in a signal-carrying manner. In other embodiments, the signal processing device 260 can also be configured in other electronic components. In other embodiments, the signal processing device 260 may be, for example, in the form of a hardware or software module in a superordinate, in particular central, electronic control unit 700, for example a vehicle control unit 702. In the present case, the signal processing device 260 has an evaluation unit 262.

In the present case, the rotary measuring system 300 has an association unit 1200, an association memory 1240 and a diagnostic unit 1260, which are arranged in an electronic control unit 700. The signal processing device 260 is configured to take the measurement voltage UM of the Hall sensor 222 as a basis for providing information in accordance with the data protocol 100, specifically using one message 120 per measurement feature 250 which has passed the rotary measuring sensor 220. The signal processing device 260 or the rotary measuring sensor 220 may advantageously be configured to provide a time stamp for each message 120.

In particular, a message 120 is generated directly after the corresponding measurement feature 250 has passed, and arrival at the message count A of the message sequence 110, that is, when a set of measurement features 250 corresponding to the message count A has passed the rotary measuring sensor 220, results in the message count A of messages 120 being provided as the message sequence 110.

The association unit 1200 is configured to detect from the data protocol 100 those messages 120 which are messages of a predetermined type 123, in particular status messages 124, and to associate them with the respective measurement feature 250. For this purpose, a feature index MIN or a number can advantageously be provided for each measurement feature 250 of the rotary scale body 240. Advantageously, the value tuple can include further components, in particular an index IN for associating the value tuple. The value tuple including the feature index MIN, the index IN and the status message 124 can advantageously be stored in the association memory 1240, in particular with an association table 1242. To clarify: a feature count MA of 80 would result in the index IN being incremented to 240 shortly before completion of a third revolution U of the rotary scale body 240 (U×MA=3×80). The feature index MIN, which always starts again from scratch after the feature count MA is reached in the course of incrementing, would accordingly be 80 (and would start again at 1 for the next measurement feature at the beginning of the fourth revolution).

Independently of their time of occurrence, messages 120 use their so-called "words" to communicate further information, the meaning of which is dependent, however, on the message type and on the type of data protocol. In an embodiment, this may be the AK data protocol mentioned further below, or a data protocol in general.

As such, the "words" of so-called channel messages—depending on the type of data protocol—can be used to transmit "channel select" information. This is a property principally of the sensor and primarily specifies a selection of the Hall elements of the Hall sensor 222, for example which two out of, in the present case, a total of three Hall elements contained in the sensor were used. This selection of the Hall elements that is generally possible in this respect and is to be performed in the specific embodiment is performed independently by the Hall sensor 222 or the rotary measuring sensor 220, specifically such that the generated voltages of the selected Hall elements are provided as far as possible non-simultaneously.

This ensures that the sensor can recognize the direction of rotation as well as possible from the relative temporal position of the two Hall element voltages. This aforementioned "channel select" mechanism is thus an example of a concrete embodiment of the concept of the disclosure; the concept of the disclosure should be understood more generally in this respect and the embodiments that follow in regard to a specific type of a Hall sensor 222 or rotary measuring sensor 220 or a specific type of a data protocol are on no account restrictive for the concept of the disclosure which should be understood generally.

The data protocol or stipulation of a data sequence is used to define which message type NT is sent in each case, or to define which is the message of a predetermined type in accordance with the general concept of the disclosure. In the present case in the embodiment to be explained, the message of a predetermined type 123 is a status message 124 in accordance with a data protocol 100. The message type NT of the message 120 in a message sequence 110 can be classified by the signal processing device 260 or suchlike evaluation unit solely on the basis of the order—which is defined by the data protocol 100.

However, the message type NT can also be additionally or alternatively encoded in the message 120, for example in specific bits of the "word" of the messages. The signal processing device 260 or suchlike evaluation unit can then identify the message type independently of the order.

The diagnostic unit 1260 can thus be used to implement diagnostic functions on the basis of the messages of a predetermined type 123, in particular status messages 124, which are stored in the association memory 1240.

By way of example, a set of peak-to-peak messages 125, each associable with a measurement feature 250, can be taken as a basis for inferring a wobble fault FT of the rotary scale body 240 and/or the rotating part 1100. A wobble fault FT exists in particular if the rotary scale body 240 and/or the rotating part 1100 no longer rotate(s) about a rotation axis AR, but rather have/has a different rotation axis. Statistical methods such as for example, regression, mean value determination and the like can be employed for this purpose. It is also possible for defined or dynamically adaptable limit values, for example, to be used by the diagnostic unit 1260 to determine outliers for identifying faults F of the measurement features 250, for example mechanical faults in the tooth-trough pairing 254, a tooth fault FZ.

It should be understood generally that a "peak-to-peak" message is used to transmit a measure of the absolute magnitude of the voltage changes when the current measurement feature moves past the sensor. Missing or damaged teeth, or tooth interspaces filled with abraded metal, cause a weaker magnetic field change, and thus smaller voltage changes (smaller peak-to-peak value), in the course of moving past.

The rotary measuring device 200 furthermore has a rotary scale body 240, depicted here merely as a detail and in an unrolled state, in which the—actually circular-arc-shaped—profile of alternating tooth tips 256 and tooth troughs 258 is shown with a straight profile here. The rotary scale body 240 is in the form of a toothed wheel 242 with a message count A of measurement features 250, the measurement features 250 each being in the form of a tooth-trough pairing 254 in the present case. A tooth tip 256 and an adjacent tooth trough 258 together form a tooth-trough pairing 254 in each case. A measurement feature 250 can have one or more feature properties 280, which can be manifested as dimensions, temperatures or suchlike state parameters. A feature property 280 is measurable, in particular, and can advantageously permit a conclusion to be drawn about the state of the measurement feature 250.

By way of example, FIG. 1 depicts yet another processing unit 264, which likewise takes the data protocol 100 as a basis for using or processing further the data of the rotary measuring device 200. In particular, the channel messages 122, advantageously the time stamps of the channel messages 122, can be taken as a basis for determining position-and/or movement-related characteristic variables, for example, an angular orientation RW, that is, rotational position, or a rotational speed RV of the rotating part 1100.

Figure 2A:
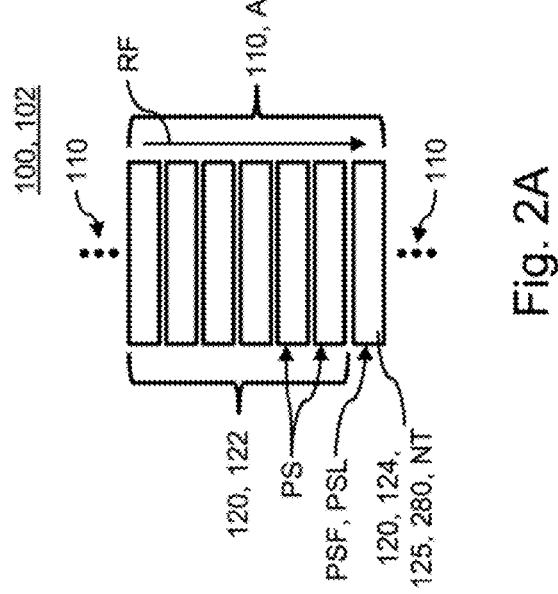
FIG. 2A and FIG. 2B each show a data protocol for embodiments of a signal processing device in accordance with the first aspect of the disclosure.

FIG. 2A schematically shows an embodiment of a signal processing device with a data protocol 100 as a cyclic succession of message sequences 110, one message sequence 110 of which is depicted in detail. The message sequence 110 of the data protocol 100 has a message count A of seven messages 120 in an order RF. Each message is situated at a sequence position PS, two of which are designated here by way of example.

The message sequence 110 has a message of a predetermined type 123 in the form of a status message 124. The status message 124 is situated at a fixed sequence position PSF for each message sequence 110. In the present case, the last message 120 in a message sequence 110 is in the form of a status message 124, that is, the fixed sequence position PSF is situated at a last sequence position PSL in the message sequence 110. The status message 124 describes a feature property 280 of the measurement feature 250 associated with it.

In the present case, the message of a predetermined type 123 is in the form of a so-called peak-to-peak message 125 describing, in the form of a numerical value, a voltage difference in the voltage induced in the Hall sensor between the highest and lowest points of a tooth-trough pairing 254. The peak-to-peak message 125 thus characterizes an actual height difference between a tooth tip 256 and a tooth trough 258 in a measurement direction MR. The peak-to-peak message 125 can thus be used to identify faults in the rotary scale body 240, for example a damaged, in particular broken-off, tooth tip 256 or a clogged tooth trough 258. Wobble or a suchlike kinematic fault of the rotary scale body 240 can also be recognized in an improved manner if a status message 124, in particular a peak-to-peak message 125, is present for each measurement feature 250, in particular because such tendencies are recognized earlier even in the case of a relatively low measurement resolution. A message 120, in particular a channel message 122 or a status message 124, is preferably in the form of a 3-bit value, and can thus assume a value between 0 and 7. In other embodiments, the status message 124 may be in a different form, for example in the form of a temperature message 126 describing a temperature T at the rotary measuring sensor 220. In other embodiments, the message 120 may be in a different form in accordance with the data protocol 100, for example in the form of a 9-bit value.

Figures 2B, 3:
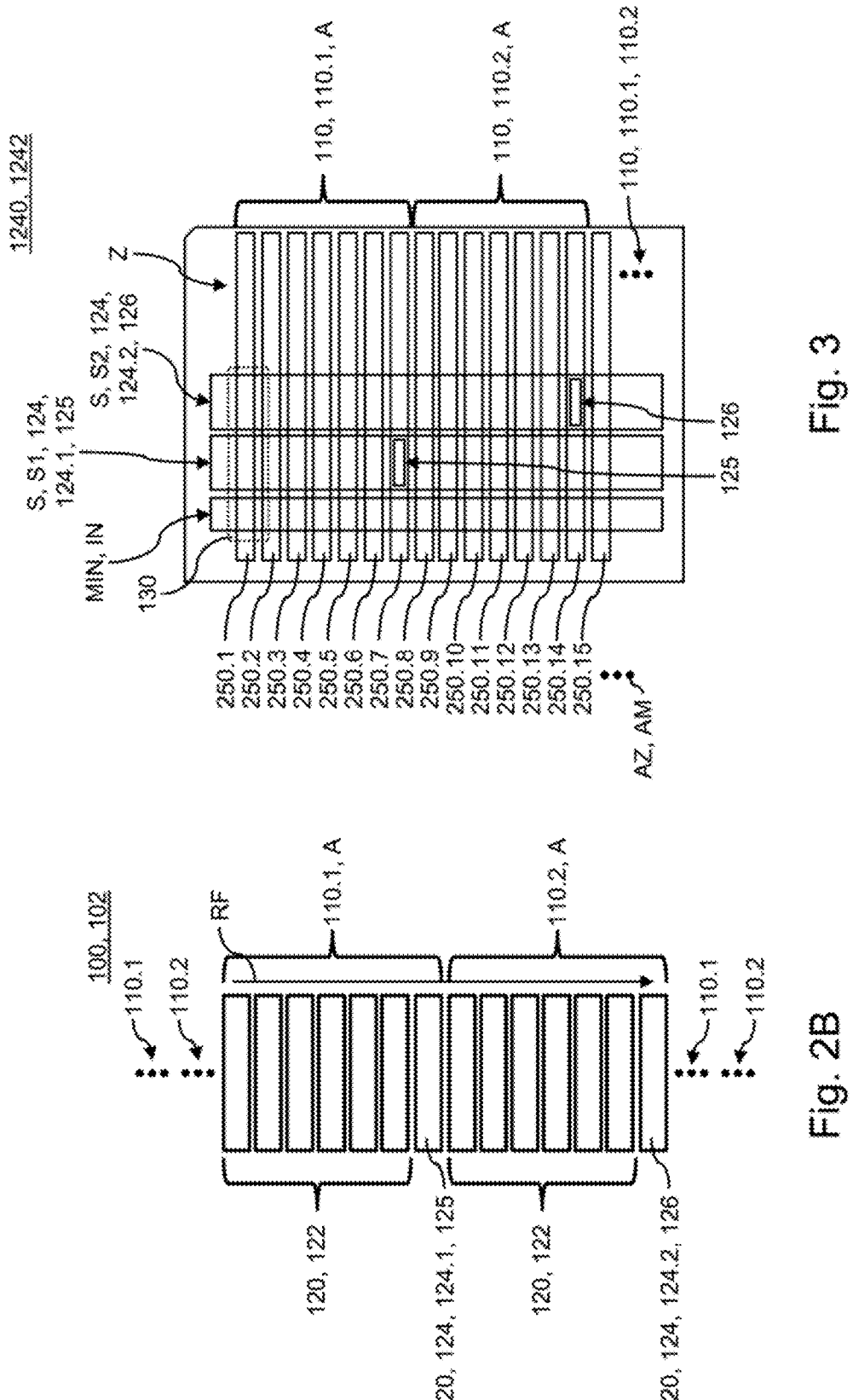
FIG. 3 shows a schematic representation of an association memory with an association table for associating a message count of status messages with in each case one measurement feature.

FIG. 2B depicts another embodiment of a data protocol 100, in which a first message sequence type 110.1 and a second message sequence type 110.2 are alternately successive. The first message sequence type 110.1 and the second message sequence type 110.2 differ in that their messages of a predetermined type 123 are status messages 124 of different type. This means that the message of a predetermined type 123 in the first message sequence type 110.1 is of a different message type NT than the message of a predetermined type 123 in the second message sequence type 110.2. A first status message 124.1 of the first message sequence type 110.1 is in the form of a peak-to-peak message 125 in the present case, and a second status message 124.2 of the second message sequence type 110.2 is in the form of a temperature message 126. The first status message 124.1 and the second status message 124.2 therefore each describe a different feature property 280 of a measurement feature 250. In such an embodiment, the different types of status messages can advantageously be taken as a basis for determining different types of diagnostic information, specifically in particular—after a sufficient message count of revolutions U—advantageously for each measurement feature 250 of the rotary scale body 240. By way of example, it is therefore possible, as in the example shown here, for both a peak-to-peak message 125 and—in a correspondingly later pass or message sequence 110—a temperature message 126 to be provided for each measurement feature 250.

In such an embodiment, each message sequence 110 thus results in the alternate provision of a peak-to-peak message 125 as the status message 124 and a temperature message 126 as the status message 124.

Nevertheless, the scope of the disclosure allows other embodiments of data protocols with a greater message count of successive message sequence types, with different types of status messages in each case.

In the data protocol additionally described by way of example in the present case, in the form of an AK protocol, 9 channel messages 122 and then one status message 124 are generated in succession. A concrete example based on a sensor functioning according to the AK protocol, for example an ATS sensor from the company Allegro, as in the ATS604 model:

A message sequence may read as follows, for example:

nine "channel selected" (in particular for the installation position of the sensor), one "peak-peak information" (voltage difference of the Hall sensor between pole and gap, in particular tooth tip and tooth trough), nine "channel selected" (in particular for the installation position of the sensor), one "temperature information" (sensor temperature).

After the message sequence has been carried out, it is repeated.

Popular rotary scale bodies, in particular pole wheels, may have a feature count, in particular tooth count, of 60, 80, 100 or 120, for example. This would result in "peak-to-peak information" or "peak-peak information" for only every tenth feature, in particular every twentieth pole or tooth tip.

In an embodiment, the repetition cycle of the "peak-to-peak information" cannot be an integer factor of the feature count, for example in this embodiment the tooth count, in order to ensure that "peak-to-peak information" is provided for each feature, for example in this embodiment each pole or each tooth tip, over a number of revolutions.

In an embodiment such as this, a corresponding message sequence reads as follows, for example:

six "channel selected" (in particular for the installation position of the sensor), one "peak-peak information" (voltage difference of the Hall sensor between pole and gap, in particular tooth tip and tooth trough), six "channel selected" (in particular for the installation position of the sensor), one "temperature information" (sensor temperature).

In this way, the "peak-peak information" is provided for every fourteenth feature, in particular every fourteenth tooth or pole, and fourteen is not an integer factor of 60, 80, 100 or 120. Therefore, "peak-peak information" is provided for other features, in particular poles or the tooth tip or tooth-trough pairings, with every revolution of the rotary scale body, here the toothed wheel or pole wheel.

In an embodiment, the message sequence is formed as follows:

three "channel selected" (in particular for the installation position of the sensor), one "peak-peak information" (voltage difference of the
Hall sensor between pole and gap, in particular tooth tip
and tooth trough), two "channel selected" (in particular for the installation
position of the sensor), one "temperature information" (sensor temperature).

In such an embodiment, the message count A is seven, and
therefore both the "peak-peak information" and the tem-
perature information are provided for every seventh mea-
surement feature. In this way, a relatively small number of
revolutions U is advantageously required in order to detect
all of the measurement features.

Depending on the feature count, here the tooth count, all
poles are considered or detected after a certain message
count of revolutions.

FIG. 3 schematically shows an association memory 1240
with an association table 1242. In this case, the association
table 1242 describes in particular the structure of a database
or a memory according to which the messages 120 provided
by the rotary measuring device 200 in accordance with the
data protocol 100 are stored and are retrievable. An asso-
ciation memory 1240 is configured in particular for storing
messages of a predetermined type 123, and in this way
enables the messages of a predetermined type 123 to be kept
available across measurement cycles, in particular for analy-
sis and diagnostic purposes. A measurement cycle within the
context of this description includes the provision of an
individual message sequence 110.

In the present case, the association table 1242 has a row
count AZ of rows Z which corresponds to the feature count
AM. An association of values, in particular of status mes-
sages 124, with an individual measurement feature 250 is
thus possible. In particular, each row Z is numbered with a
feature index MIN for the purpose of association with a
measurement feature 250. In the present case, the first fifteen
rows Z for the first fifteen measurement features 250.1 to
250.15 are depicted by way of example. By way of example,
the association memory 1240 and the association table 1242
are depicted here for the embodiment of a data protocol 100
shown in FIG. 2B, with a first message sequence type 110.1
and a succeeding second message sequence type 110.2. In
this case, the first seven rows are intended to be associated
with a first message sequence 110 of the first message
sequence type 110.1, the next seven rows are intended to be
associated with a second message sequence 110 of the
second message sequence type 110.2. The fifteenth row,
associated with the measurement feature 250.15, thus forms
the beginning, that is, the first message, of a third message
sequence 110 of the first message sequence type 110.1. For
each category of status messages 124, provision may be
made for a column S in the association table 1242, this
being, in the present case, a first column S1 for the first status
message 124.1 in the form of the peak-to-peak message 125
and a second column S2 for the second status message 124.2
in the form of the temperature message 126. During opera-
tion of the rotary measuring device 200, therefore, the status
messages 124 are gradually stored, in particular by an
association unit 1200, in the corresponding column S1, S2 in
accordance with their type. In particular, the channel mes-
sages 122 are not considered in the course of storage. With
each measurement cycle, that is, with each message
sequence 110, a further value of a status message 124 is thus
included in the association table 1242. Alternatively or
additionally, the row count AZ may be some other number,
which is different than the feature count AM. As an alter-
native or in addition to the feature index MIN, each row Z can have an index IN for the association of each row Z in the
association table 1242. Advantageously, a value tuple 130 is
stored in each row Z.

Figures 4, 5A, 5B:
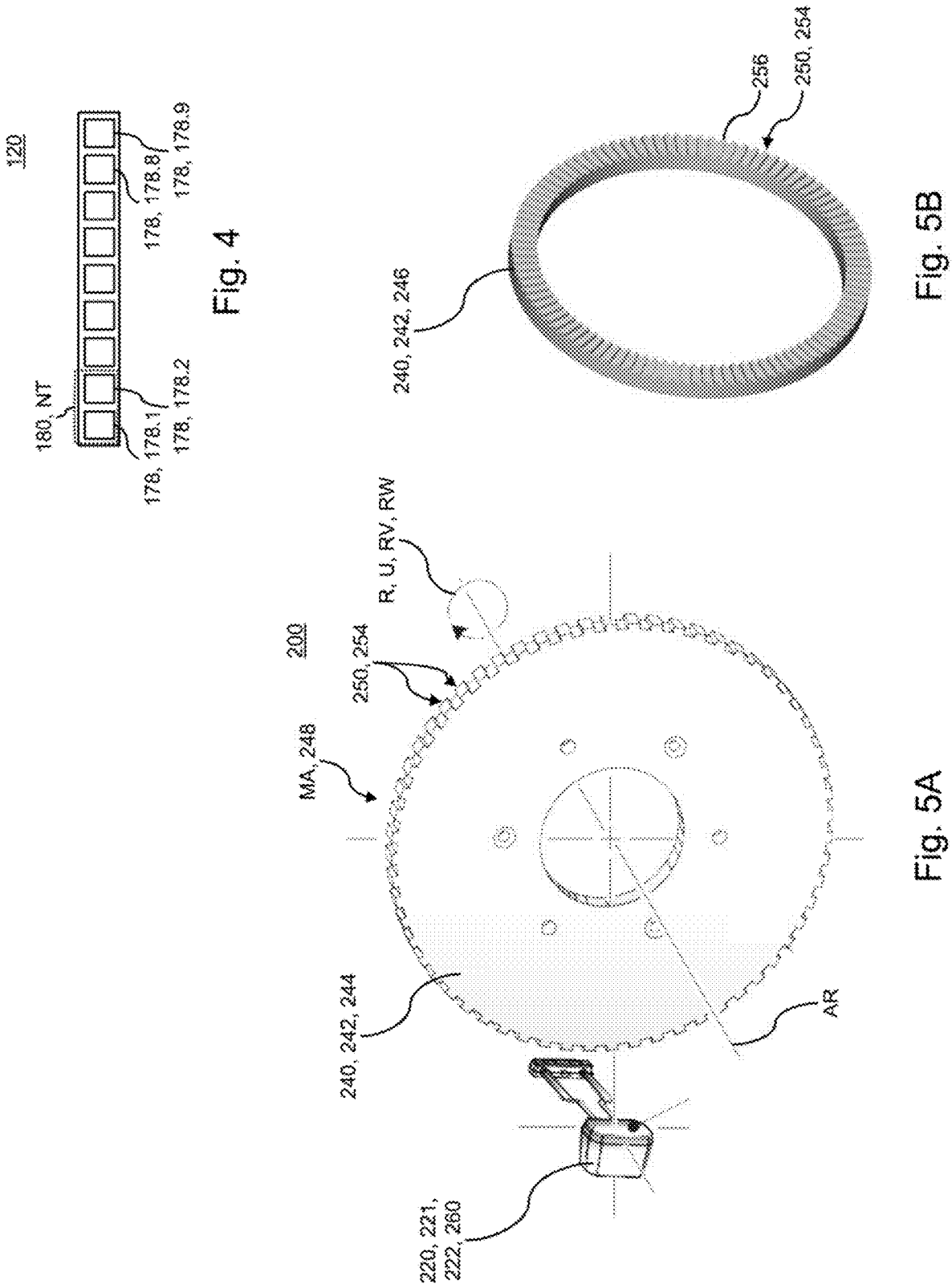
FIG. 4 shows a schematic configuration of a message containing message bits.
FIG. 5A shows a perspective view of an embodiment of a rotary measuring device in accordance with the second aspect of the disclosure.
FIG. 5B shows a perspective view of another rotary scale body in the form of a crown wheel; and, FIG. 6 shows a schematically depicted embodiment of a vehicle in accordance with the third aspect of the disclosure, including a rotary measuring device in accordance with the second aspect of the disclosure.

FIG. 4 schematically shows an advantageous configura-
tion of a message 120. A message 120 is advantageously
constructed by a number of message bits 178. Preferably,
each message 120 has the same structure, in particular the
same number of message bits 178. In the present case, the
message 120 has a number of nine message bits 178, which
are correspondingly numbered from a first message bit 178.1
to a ninth message bit 178.9. This is therefore a 9-bit
message. In the case of the message 120 shown here, the first
message bit 178.1 and the second message bit 178.2 advan-
tageously form a property identifier 180, via which the
message type NT of a message 120 can advantageously be
identified. In this way, the property identifier 180 can
advantageously be used to indicate whether the message 120
is a channel message 122, or a message of a predetermined
type 123, such as for example, a peak-to-peak message 125
or a temperature message 126. In other embodiments of
signal processing devices 260, the configuration of a mes-
sage 120 may be in a different form, in particular may have
more or fewer message bits 178, or may have a property
identifier 180 at another location in the message 120.

FIG. 5A shows a perspective view of a rotary measuring
device 200 in accordance with the second aspect of the
disclosure. The rotary scale body 240 is in the form of a
toothed wheel 242 in the form of a spur gear 244, which has
a feature count AM of measurement features 250 which are
in the form of tooth-trough pairing 254 and arranged on the
toothed wheel 242 equidistantly along a circular path 248.
The rotary scale body 240 is connected to a rotating part
1100 (not depicted here) in particular for conjoint rotation
therewith, in order to measure a rotational movement R of
the rotary scale body 240—and thus of the rotating part
1100. The greater the feature count AM, the smaller the
measurable sections of the rotary scale body 240. In this
case, a revolution U corresponds to a movement of the rotary
scale body 240 through 360° around the rotation axis AR.
Given a feature count MA of 60, a measurement feature 250
thus extends over a circle segment of 6°. The greater the
feature count MA, the more accurately the rotational move-
ment R, in particular a rotational speed RV or angular
orientation RW, can be detected. A toothed wheel 242 within
the context of the disclosure encompasses any bodies having
in particular a rotationally symmetrical main body and a
number of geometric features which vary the distance from
a rotary measuring sensor 220 in regard to the measurement
direction MR during a rotational movement R. In this case,
it is sufficient for measurement purposes in particular if a
tooth tip is in rectangular form, that is, is rising and falling
perpendicularly in a tangential direction as shown here in
FIG. 5A. The rotary measuring sensor 220 includes a pickup
221 in the form of a Hall sensor 222. In the embodiment
shown here, the rotary measuring sensor 220 advanta-
geously includes the signal processing device 260.

Other forms of toothed wheels 242 are also possible, for
example a crown wheel 246 having tooth tips 256 formed in
an axial direction, as shown here by way of example in FIG.
5B.

Figure 6:
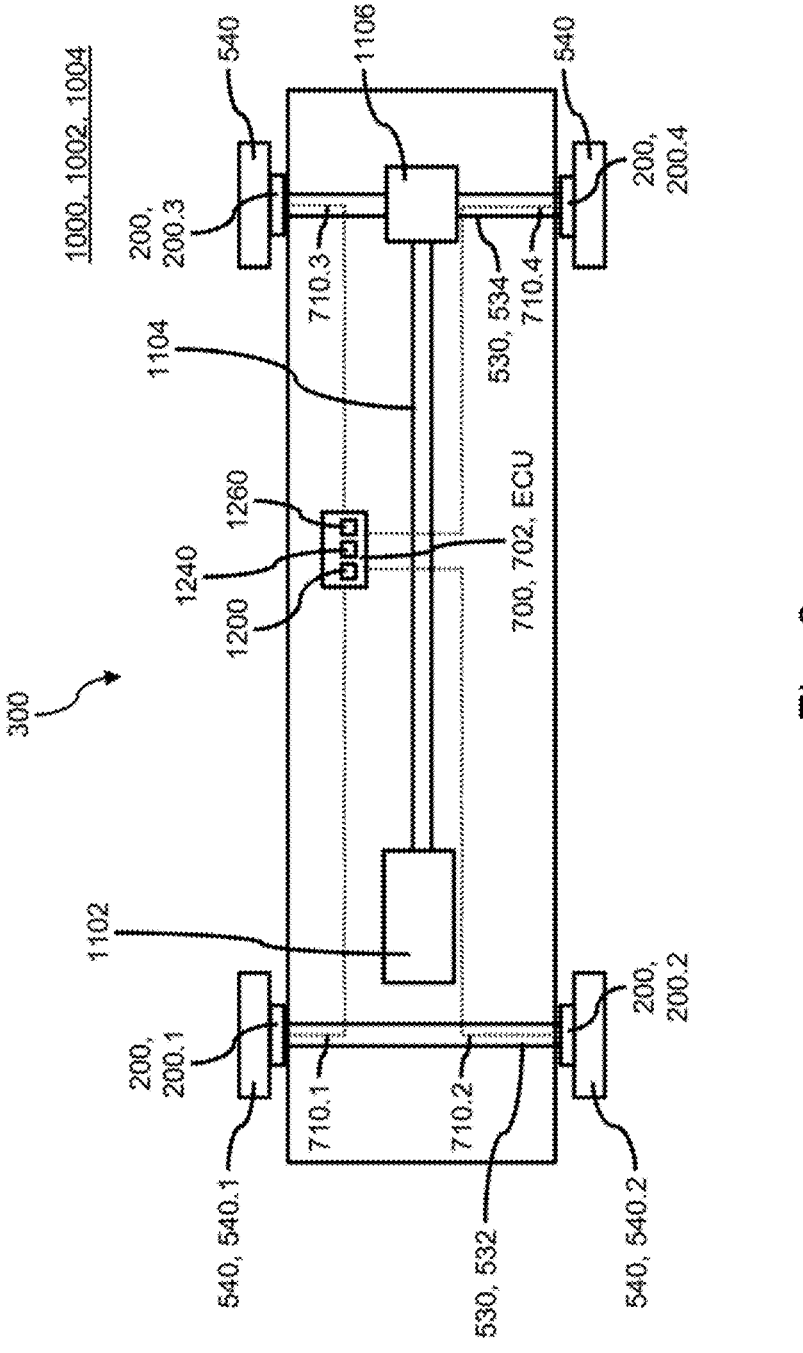

FIG. 6 shows, highly schematically, a vehicle 1000 with
a rotary measuring system 300 having a number of four
rotary measuring devices 200 in accordance with the second
aspect of the disclosure. The vehicle 1000, as shown here,
may be in the form of an automobile 1002. In other
embodiments, the vehicle 1000 may be in a different form,
for example in the form of a utility vehicle 1004. The vehicle has two axles 530, namely a front axle 532 and a rear axle 534. The rear axle 534 is driven by a drive 1102 via a drive shaft 1104 and a differential 1106. Two wheels 540 are mounted on each axle 530. A first wheel 540.1 with a first rotary measuring device 200.1 and a second wheel 540.2 with a second rotary measuring device 200.2 are arranged on the front axle 532, and a third wheel 540.3 with a third rotary measuring device 200.3 and a fourth wheel 540.4 with a fourth rotary measuring device 200.4 are arranged on the rear axle 534. The respective wheel 540 thus constitutes the rotating part 1100 for the associated rotary measuring device 200. The first rotary measuring device 200.1 is connected to an electronic control unit 700 in the form of a vehicle control unit 702 in a signal-carrying manner via a first rotary measuring signal line 710.1. The electronic control unit 700 has an association unit 1200, an association memory 1240 and a diagnostic unit 1260. Analogously, the other rotary measuring devices 200.2, 200.3, 200.4 are each connected to the electronic control unit 700 in a signal-carrying manner by way of a rotary measuring signal line 710.2, 710.3, 710.4. In embodiments, the electronic signal processing device 260 or the association unit 1200, the association memory 1240 or the diagnostic unit 1260 may be arranged as a hardware or software module in a different electronic control unit.

It is understood that the foregoing description is that of the preferred embodiments of the disclosure and that various changes and modifications may be made thereto without departing from the spirit and scope of the as defined in the appended claims.

LIST OF REFERENCE SIGNS (PART OF THE DESCRIPTION)

100 data protocol
110 message sequence
110.1, 110.2 first and second message sequence types
120 message
122 channel messages
123 predetermined type messages
124 status messages
124.1, 124.2 first and second status messages
125 peak-to-peak message
126 temperature message
130 value tuple
178 message bit
178.1-178.9 first to ninth message bits
180 property identifier
200 rotary measuring device
200.1-4 first to fourth rotary measuring devices
220 rotary measuring sensor
221 pickup
222 Hall sensor
240 rotary scale body
242 toothed wheel
244 spur gear
246 crown wheel
248 circular path
250 measurement feature
254 tooth-trough pairing
256 tooth tip
258 tooth trough
259 tooth edge
260 signal processing device
262 evaluation unit
264 further processing unit
280 feature property
300 rotary measuring system 530 axle
532 front axle
534 rear axle
540 wheel
540.1-4 first to fourth wheels
700 electronic control unit
702 vehicle control unit
710 rotary measuring signal line
710.1-4 first to fourth rotary measuring signal lines
1000 vehicle
1002 automobile
1004 utility vehicle
1100 rotating part
1102 drive
1104 drive shaft
1106 differential
1200 association unit
1240 association memory
1242 association table
1260 diagnostic unit
A message count
AM feature count
AR rotation axis
AZ row count
F faults
FT wobble fault
FZ tooth fault
IN index
MA feature count
MIN feature index
MR measurement direction
NT message type
PS sequence position
PSF fixed sequence position
PSL last sequence position
R rotational movement
RF order
RV rotational speed
RW angular orientation
S column
U revolutions
UM measurement voltage
Z row

The invention claimed is:

1. A signal processing device for a rotary measuring device having a rotary measuring sensor and a rotary scale body having a feature count of measurement features, comprising:

a non-transitory computer readable medium having program code stored thereon;

said program code being configured, when executed by a processor, to cause the signal processing device to provide a plurality of chronologically successive message sequences;

each of said message sequences having a message count of successive messages such that chronologically successive messages are chronologically successively assigned to locally adjacent measurement features, wherein the measurement features interact with the rotary measuring sensor, and each of the messages is provided in a message type selected from a predetermined number of message types;

the message of the successive messages arranged at a fixed sequence position of the message sequences being a message of a predetermined type which describes a feature property of the assigned measurement features; and, said program code being configured to cause the signal processing device to generate the message sequences such that the message count and the feature count are coprime with one another.

2. The signal processing device of claim 1, wherein a quotient of the feature count and the message count is not an integer.

3. The signal processing device of claim 1, wherein the message count is a prime number.

4. The signal processing device of claim 1, wherein the message count is a smaller or smallest prime number not occurring in a prime factor decomposition of the feature count.

5. The signal processing device of claim 1, wherein at least one of:

each message sequence is generated such that the message count and the feature count are coprime with one another; and, the message count of successive messages is provided in an order predetermined by an associated data protocol and the successive message sequences are provided in an order predetermined by the associated data protocol.

6. The signal processing device of claim 1, wherein the message of the predetermined type is a status message in accordance with a data protocol.

7. The signal processing device of claim 1, wherein the message of the predetermined type is a status message in accordance with a data protocol; and, a last message in the message sequences is the status message.

8. The signal processing device of claim 1, wherein a first message sequence type and a second message sequence type are alternately successive; and, the first message sequence type includes a first status message and the second message sequence type includes a second status message.

9. The signal processing device of claim 8, wherein at least one of the first status message is a peak-to-peak message and the second status message is a temperature message.

10. The signal processing device of claim 1, wherein a data protocol is an AK protocol.

11. The signal processing device of claim 10, wherein the message count is seven.

12. The signal processing device of claim 1 further comprising an electrical interface for connection to a separate electrical line to the rotary measuring sensor.

13. A rotary measuring device for a rotating part, the rotary measuring device comprising:

a rotary measuring sensor;

a rotary scale body having a feature count of measurement features;

a signal processing device connected to a pickup in a signal-carrying manner;

the signal processing device being configured to provide a plurality of chronologically successive message sequences;

each of said message sequences having a message count of successive messages such that chronologically successive messages are chronologically successively assigned to locally adjacent measurement features, wherein the measurement features interact with the rotary measuring sensor, and each of the messages is provided in a message type selected from a predetermined number of message types;

the message of the successive messages arranged at a fixed sequence position of the message sequences being a message of a predetermined type which describes a feature property of the assigned measurement features; and, the signal processing device being configured to generate the message sequences such that the message count and the feature count are coprime with one another.

14. The rotary measuring device of claim 13, wherein the rotary part is a shaft or a wheel of a vehicle.

15. The rotary measuring device of claim 13, wherein the measurement features are arranged at least one of along a circular path and equidistantly.

16. The rotary measuring device of claim 13, wherein the rotary scale body is a toothed wheel.

17. The rotary measuring device of claim 16, wherein at least one of the measurement features is a tooth-trough pairing including a tooth tip and a tooth trough.

18. A vehicle comprising the rotary measuring device of claim 13.

19. A rotary measuring system comprising:

at least one rotary measuring device for a rotating part;

the rotary measuring device including a rotary measuring sensor and a rotary scale body having a feature count of measurement features;

the rotary measuring device including a signal processing device connected to a pickup in a signal-carrying manner;

the signal processing device being configured to provide a plurality of chronologically successive message sequences;

each of said message sequences having a message count of successive messages such that chronologically successive messages are chronologically successively assigned to locally adjacent measurement features, wherein the measurement features interact with the rotary measuring sensor, and each of the messages is provided in a message type selected from a predetermined number of message types;

the message of the successive messages arranged at a fixed sequence position of the message sequences being a message of a predetermined type which describes a feature property of the assigned measurement features;

the signal processing device being configured to generate the message sequences such that the message count and the feature count are coprime with one another; and, an association unit configured to associate the message of the predetermined type arranged at the fixed sequence position in the message sequences with one of the measurement features.

20. The rotary measuring system of claim 19, wherein the message of the predetermined type arranged at the fixed sequence position in the message sequences is a status message of the message sequences.

21. The rotary measuring system of claim 19, wherein the association exists in a form of a value tuple, on a basis of the message count.

22. The rotary measuring system of claim 19, wherein the association exists in a form of a value tuple, on a basis of the message count pursuant to an associated data protocol.

23. The rotary measuring system of claim 19 further comprising at least one of an association memory and an association table configured to store an associated message of the predetermined type for each of one or more measurement features.

24. The rotary measuring system of claim 19 further comprising at least one of an association memory and an association table configured to store a value tuple for each of one or more measurement features.

25. The rotary measuring system of claim 19 further comprising a diagnostic unit configured to recognize at least one of a fault state and an operating state according to at least one measurement feature associated with the message of the predetermined type.

26. The rotary measuring system of claim 19 further comprising a diagnostic unit configured to recognize at least one of a fault state and an operating state according to at least one value tuple.

27. A vehicle comprising the rotary measuring system of claim 19.

28. The vehicle of claim 27, wherein the rotary measuring device is for a shaft or a wheel of the vehicle.

\* \* \* \* \*